United States Patent [19]

Reinert

[11] 4,235,597
[45] Nov. 25, 1980

[54] GRANULES OF TEXTILE PROCESSING AGENTS FOR USE IN ORGANIC SOLVENT LIQUORS

[75] Inventor: Gerhard Reinert, Allschwil, Switzerland

[73] Assignee: Ciba-Geigy Corporation, Ardsley, N.Y.

[21] Appl. No.: 740,708

[22] Filed: Nov. 11, 1976

[30] Foreign Application Priority Data

Nov. 27, 1975 [CH] Switzerland ............... 15393/75

[51] Int. Cl.³ .................. C09B 67/02; C09B 67/10; C09K 11/02; C08L 91/06
[52] U.S. Cl. .............................. 8/526; 8/558; 8/552; 252/301.21; 252/301.34; 252/301.35; 106/31; 106/272
[58] Field of Search ............ 8/79, 1 W; 252/301.35, 252/301.34, 301.21; 260/29.6 PM; 106/31, 272

[56] References Cited

U.S. PATENT DOCUMENTS

| 2,618,384 | 12/1952 | Hatfield | 8/79 |
|---|---|---|---|
| 3,071,615 | 1/1963 | MacKinnon | 8/79 |
| 3,321,426 | 5/1967 | Dorsey | 106/272 |
| 3,336,155 | 8/1967 | Rowe | 8/79 |
| 3,422,049 | 1/1969 | McClain | 260/29.6 PM |
| 3,454,347 | 7/1969 | Leimbacher | 8/2 |
| 3,485,761 | 12/1969 | Haxby | 252/301.24 |
| 3,782,895 | 1/1974 | Goorhuis | 8/2 |
| 3,856,699 | 12/1974 | Miyano et al. | 8/79 |
| 3,948,599 | 6/1976 | Irmiger et al. | 8/79 |
| 4,058,480 | 11/1977 | Lohmann et al. | 252/301.21 |

FOREIGN PATENT DOCUMENTS 2021336 11/1970 Fed. Rep. of Germany ............ 8/79
2243994 11/1975 France .
1446735 8/1976 United Kingdom .

OTHER PUBLICATIONS

Farber, H. A. et al. American Dyestuff Reporter, vol. 58, Nov. 18, 1968, pp. 53–56.
Souther, G. American Dyestuff Reporter, vol. 61, Jan. 1970, pp. 23–27.

*Primary Examiner*—Joseph L. Schofer
*Assistant Examiner*—Maria S. Tungol
*Attorney, Agent, or Firm*—Prabodh I. Almaula

[57] ABSTRACT

Non-dusty, free-flowing granules of textile processing agents for solvent application, which granules contain at least one textile processing agent, optionally together with a dispersing agent and/or further auxiliaries, dissolved in an organic carrier which is solid at room temperature and which is soluble in halogenated hydrocarbon, as well as a process for the production of these granules.

9 Claims, No Drawings

GRANULES OF TEXTILE PROCESSING AGENTS FOR USE IN ORGANIC SOLVENT LIQUORS

The present invention relates to solid formulations of textile processing agents, particularly optical brighteners, for application from halogenated hydrocarbons, to processes for producing these solid formulations as well as to their use in halogenated hydrocarbon treating liquors.

Textile processing agents, such as optical brighteners, textile finishing agents and dyes for solvent application, are marketed as liquid formulations. If a specific formulation of these products is to be effected, with full consideration being given to factors of safety and technical requirements, the products are formulated in the solvent (e.g. perchloroethylene) which is also used in the application machine as the regeneration solvent.

For handling in the textile industry, in the machine, etc., the liquid formulations have very favourable properties, such as convenient measuring out, simple transference by pouring, trouble-free distribution (dissolving, dispersing, emulsifying) in the liquor, no release of dust, etc.

A number of significant disadvantages are however attached to these advantages on application. To be mentioned in particular are increased costs of packing, and limitations—observance of safety precautions and of restrictions concerning safety—on dispatch of the products, since the solvents used for formulating are in many cases toxic, combustible and ignitable. Furthermore, in the handling of the products it is necessary to take certain protective measures against the toxic solvent vapours. It is also to be noted that, for reasons of safety, liquid formulations cannot be universally employed in all regeneration solvents.

French Pat. No. 2,243,994 describes solid compositions which contain an active substance (optical brightener) dissolved in a solid melt of a carrier material. Although some of the claimed carrier materials are said to be soluble in certain unspecified organic solvents, the granules described in this patent are employed exclusively for aqueous application of the optical brighteners.

For textile processing agents, there have now been developed novel solid formulations which satisfy the aforementioned criteria and which are excellently suitable for application from organic solvents, especially from halogenated hydrocarbons, particularly perchloroethylene. These solid formulations are obtained by a process in which a textile processing agent, optionally together with a dispersing agent and/or further auxiliaries, is dissolved in the melt of one or more organic carriers soluble in halogenated hydrocarbon, and this melt is then allowed to solidify.

The formulations themselves are granules, which consist of at least one textile processing agent which, optionally together with a dispersing agent and/or further auxiliaries, is melted into a largely inert organic carrier which is solid at room temperature and which is soluble in halogenated hydrocarbon (preferably perchloroethylene).

The granules according to the invention are in general composed of:

(a) 5 to 60 percent by weight of a textile processing agent, and
(b) 40 to 95 percent by weight of at least one carrier.

Also dyes for shading the optical brighteners can if required be incorporated into the granules. There is also the possibility of adding to the formulations dispersing agents (e.g. cellulose derivatives such as ethylcellulose, amine salts of cellulose sulphate), which serve to disperse textile processing agents that are insoluble in perchloroethylene.

Particularly valuable granules contain, relative to the total weight of the granule, 7 to 40 percent by weight of the textile processing agent and 60 to 93 percent by weight of carrier.

Suitable as organic carriers are substances which are in the solid state at room temperature, and in the melt of which the textile processing agent has a satisfactory solubility, preferably higher than 10%. Furthermore, the nature of the carrier must be such that on application of the granules the release of the incorporated textile processing agent occurs at the desired rate, i.e. the carrier has to be soluble in the organic solvent of the liquor (preferably perchloroethylene). The carrier should moreover be as cheap as possible, as inert as possible coloristically, to a great extent nontoxic and practically colourless, and must be a good "solvent" for the textile processing agent. Suitable products for this purpose are, e.g., polymers such as low-molecular polyethylenes (e.g. polyethylene waxes), montan waxes and derivatives thereof, fatty acids and fatty acid derivatives, fatty alcohols having at least 12 carbon atoms, fatty alcohol derivatives, phthalic acid derivatives, terephthalic acid derivatives, polyacrylates, polymethacrylates, paraffins, etc., which are solid under normal conditions and which, when produced by the emulsifying process described below, are insoluble in the emulsifying liquid (preferably water).

These carriers can be used singly or in admixture with each other. Suitable carriers particularly for textile processing agents insoluble in water are, e.g., stearic acid, polyethylene wax, preferably having a molar weight of about 2000, polyvinyl ether of octadecyl alcohol, hard paraffin, stearic acid amide, terephthalic acid dimethyl ester, phthalic acid dicyclohexyl ester or phthalic acid monobenzyl ester.

The textile processing agents which are melted into the carriers can for their part be either soluble or dispersible in the solvent used for the application, preferably perchloroethylene. In the case where they are dispersible, sand grinding is not necessary. All textile processing agents which are soluble in the carrier substance in the amounts sufficient for the application are suitable for the process.

In the solid formulations according to the invention, the textile processing agents concerned are, in particular, optical brighteners and finishing agents. A mixture of textile processing agents may however be used, such as a mixture of an optical brightener and a shading dye.

The optical brighteners can belong to the widest variety of chemical classes. They are, e.g., derivatives of diaminostilbenedisulphonic acid, derivatives of distyryl-4,4'-diphenyl, distyryl-4,4'-benzene, benzidene, benzimidazole or dibenzimidazole, derivatives of 4-alkoxy- or 4,5-dialkoxy-1,8-naphthalimide, derivatives of oxazole (preferably benzoxazole), oxacyanine or 1,3-diphenylpyrazoline, as well as coumarins (preferably 3,7-substituted types such as 3-phenyl-7-substituted coumarins or 4-methyl-7-dialkylamino-coumarins).

The most varied products are suitable as finishing products, e.g. delustring agents in the form of inorganic pigments based on titanium dioxide or silicon dioxide. It is possible to use fungistatic substances, bactericides, water-repellent agents, antistatic agents, handle finishing agents and flameproofing agents.

The solid formulations are produced preferably by dissolving the textile finishing agent and, optionally, a dispersing agent and/or a further auxiliary in an organic carrier, which is solid under normal conditions (room temperature), and allowing the melt to solidify. The process is performed preferably by emulsifying the melt in a liquid in which the melt is insoluble, e.g. water, with the aid of an emulsifier, and then cooling the emulsion. The solid formulations are obtained by this procedure in the form of fine free-flowing granules, which are subsequently filtered off and dried. The organic carriers must therefore be insoluble or difficultly soluble in the liquid, preferably water.

Since the solubility of the textile processing agent increases in most melts with rising temperature, the amount of textile processing agent which is dissolved can be varied by the temperature of the melt. The upper limit of the temperature of the melt is determined by the thermal stability of its constituents. The temperature at which the constituents of the melt are brought together can be up to 200° C. In general, however, they are melted together at 100° to 180° C., preferably at 110° to 150° C.

The melt is maintained at these temperatures, optionally with stirring, until the constituents are completely dissolved or dispersed.

The granules according to the invention are produced particularly advantageously in the following manner since the granules are formed as fine solid particles, the carriers of which dissolve very rapidly and uniformly in the halogenated hydrocarbon of the application liquor, with the processing agents then being dissolved or dispersed in the liquor. This preferred process comprises heating about 5 to 60 parts of the dry textile processing agent together with 40 to 95 parts of carrier, with stirring, to about 70° to 130° C. depending on the type of carrier. After a brief stirring, a melt of the textile processing agent in the carrier is obtained. After partial cooling to about 100° C., the melt is introduced, with stirring, into a hot liquid, preferably boiling water, wherein the melt is difficultly soluble or preferably insoluble, which liquid contains per liter 1 to 10 g, advantageously 2 to 5 g, of an emulsifier. The emulsifier serves to emulsify the textile processing agent/carrier solution in the liquid. The stirring rate is so adjusted that an emulsion forms, whereupon, as a result of slow cooling with continuous, preferably vigorous, stirring the emulsified droplets of the melt are caused to solidify and the emulsion becomes a dispersion. The emulsifying liquid container water and emulsifier is then removed, e.g. by filtration and pressing out or by centrifuging, and the resulting granules are dried. The emulsifying liquid can be used repeatedly.

Suitable emulsifiers for this process are those customarily used for textile processing, such as anionic emulsifiers, e.g. those based on sulphosuccinic acid ester or alkyl-naphthalenesulphonic acid, or nonionic emulsifiers, e.g. ethylene oxide adducts such as alkylphenyl-polyglycol ethers, e.g. of the reaction products of 9 to 10 moles of ethylene oxide with p-nonylphenol, or acyl-polyglycol ethers and, in particular, alkylpolyglycol ethers, e.g. oxethylated fatty alcohols of the formula

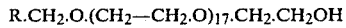

R.CH$_2$.O.(CH$_2$—CH$_2$.O)$_{17}$.CH$_2$.CH$_2$OH wherein R represents alkyl having 11 to 18 carbon atoms. It is also possible to use cationic emulsifiers.

The emulsifying liquid is so chosen that the carrier or melt is immiscible therewith, so that, on cooling, the melt granules precipitate from the emulsion. The emulsifying liquid preferably used is boiling water. Spherical granules are obtained and these are dried in an air stream at about 50° C. or in vacuo at room temperature.

Larger or smaller granules can be obtained by varying the speed of stirring during cooling.

The solid formulations obtained are dustfree, very free-flowing, scarcely toxic when suitable carriers are chosen, simple to measure out without need of safety precautions, and even at room temperature very readily and rapidly soluble in halogenated hydrocarbon application liquors. On application, the granules according to the invention release the textile processing agents as a solution or a finely divided dispersion. Furthermore, the formulations are not limited to application in a specific organic solvent: they can be applied in all such solvents in which the organic carrier is soluble.

Moreover, these granules are dimensionally stable, hydrophobic, solvent-free (important with regard to packing and transport), easy to handle and do not lead to a concentration of undesirable substances in regeneration solvents.

The granules according to the invention are particularly suitable for producing optical brightener preparations or processing liquors from halogenated hydrocarbon, preferably from tetrachloroethylene (perchloroethylene), which can be used for optically brightening or processing the widest variety of materials, especially textile materials, from an organic liquor.

Suitable halogenated hydrocarbon liquors for textile processing are especially halogenated lower aliphatic hydrocarbons, principally those having a boiling point between 45° and 180° C., e.g. chloroform, carbon tetrachloride, dichloroethane, tetrachloroethane, perchloroethane, 1,1,2-trichloro-2,2,1-trifluoroethane, dibromoethylene, 1- or 2-chloropropane, dichloropropane, trichloropropane, chlorobutane, 1,4-dichlorobutane, 2-chloro-2-methyl-propane or dichlorohexane; or aromatic chlorinated or fluorinated hydrocarbons, such as chlorobenzene, fluorobenzene, chlorotoluene and benzotrifluoride. Particularly valuable are chlorinated hydrocarbons boiling between 70° and 130° C., such as trichloroethylene, 1,1,1-trichloroethylene and especially tetrachloroethylene ("perchloroethylene"). Also mixtures of the halogenated hydrocarbons mentioned can be used.

The invention is illustrated by the following Examples but is not limited by them. The term 'parts' denotes parts by weight and temperatures are given in degrees Centigrade.

EXAMPLE 1

20 g of the optical brightener of the formula

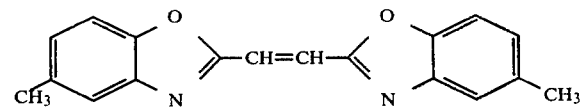

is mixed with 80 g of stearic acid (dropping point 70°), and heated to about 120°; after a brief stirring, a clear light-yellow melt is obtained. With continuous stirring with an emulsifying device, e.g. the ®Ultra-Turrax, the melt is slowly poured into 500 ml of hot water at 90° to which has been added per liter 3 g of the oxethylated fatty alcohol of the formula

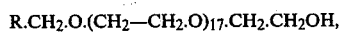

wherein R represents alkyl having 11 to 18 carbon atoms. With continuous emulsifying, the emulsion is cooled—to about 50°—until it becomes a dispersion. This is filtered, squeezed out and dried in an air stream at 50°.

There are obtained free-flowing, non-dusty granules composed of 20 percent by weight of the above optical brightener and 80 percent by weight of stearic acid, which dissolve at room temperature in perchloroethylene, and which can be used for optically brightening polyester, polyamide or triacetate fibre material in the continuous process from an organic liquor.

EXAMPLE 2

The procedure is carried out as recorded in Example 1 with the exception however that the carrier substance is replaced by the same amount of an oxidised polyethylene wax, e.g. "Hoechst-Wachs PAD 522" having a dropping point of about 92°, a molecular weight of about 2000 and an acid number of about 25.

There are obtained light-yellow, free-flowing granules which dissolve in perchloroethylene, trichloroethylene and 1,1,1-trichloroethane, and which can be used for the optical brightening of polyester, polyamide and triacetate fibre material in the continuous process.

EXAMPLE 3

The procedure is carried out as recorded in Example 1 but using the following products (amounts corresponding to those in Example 1):
as optical brightener

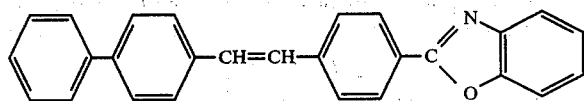

as carrier substance: Hoechstwachs V (polyvinyl ether of octadecyl alcohol); and
as emulsifier: 2-ethylhexanol ester of sulphosuccinic acid.

The resulting product is a green-yellowish, free-flowing, non-dusty powder, which is readily soluble in application concentrations in chlorinated hydrocarbons, such as perchloroethylene. It can be used for optically brightening polyester fibre material in the thermofixing process.

EXAMPLE 4

The procedure is carried out as recorded in Example 1 with the exception however that the carrier substance is replaced by the same amount of an oxidised polyethylene wax, e.g. "Hoechst-Wachs PAD 522". Instead of the optical brightener used in Example 1, there is used an optical brightener of the formula

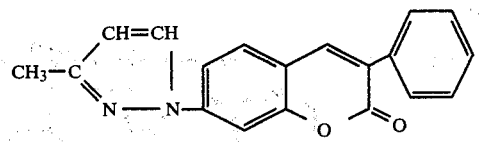

The product obtained is a yellow powder which, when introduced in application concentrations in perchloroethylene, produces a dispersion of the brightener, which can be used for optically brightening polyester, polyamide and triacetate fibre material by the thermofixing process or by the steaming process.

EXAMPLE 5

Optical brightener granules containing also a shading dye are produced by carrying out the procedure as recorded in Example 1 but additionally adding to the melt 30 mg of the disperse dye of the following formula:

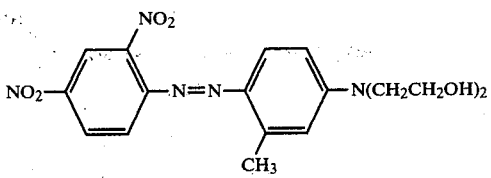

There is obtained a beige-coloured loose powder which can be used to produce reddish optical brightenings on polyester fibre material.

Granules having similar properties are obtained by replacing the carrier substances in the above Examples by a corresponding amount of one of the carrier substances given in the following Table I, column 2, with the procedure otherwise being as described in Example 1.

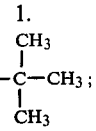

TABLE I

| Example No. | Carrier substance |
|---|---|
| 6 | hard paraffin |
| 7 | stearic acid amide |
| 8 | terephthalic acid dimethyl ester |
| 9 | phthalic acid dicyclohexyl ester |
| 10 | phthalic acid monobenzyl ester |

By using in Example 1, instead of the optical brightener given there, the same amount of one of the optical brighteners listed in the following Table II, column 2, and instead of the carrier substance given there the same amount of one of the carrier substances contained in the following Table II, column 3, with the procedure otherwise being as recorded in Example 1, there are likewise obtained free-flowing, non-dusty products which dissolve in organic solvents, e.g. in perchloroethylene, and which can be used for optically brightening the fibre materials given in the following Table II, column 4.

TABLE II

| Example No. | Optical brightener | Carrier substance given in Example No. | Fiber material |
| --- | --- | --- | --- |
| 11 | ![structure] | 2, 7, 8, 9 or 10 | polyester cellulose-acetate |
| 12 | ![structure] | 2 or 10 | polyamides polyacrylo-nitrile cellulose-acetate wool |
| 13 | ![structure] | 2, 8, 9 or 10 | mod. polyester polyacrylo-nitrile |
| 14 | ![structure] | 1 or 2 | polyacrylonitrile polyamides cellulose-acetate |
| 15 | ![structure] | 1 or 2 | polyamides polyacrylo-nitrile cellulose acetate |

EXAMPLE 16

10 g of the substance of the formula

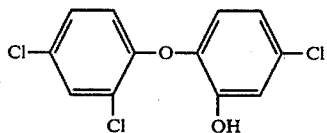

is melted together with 100 g of polyethylene wax (e.g. ®Hoechst-Wachs PAD 522) at 130°. The melt is further processed in the manner described in Example 1.

The resulting almost white, non-dusty, free-flowing granules containing 9.09% of active substance and 90.91% of polyethylene wax can be used as a bactericide for application, e.g. from perchloroethylene, to all fibres.

EXAMPLE 17

10 g of the substance of the formula

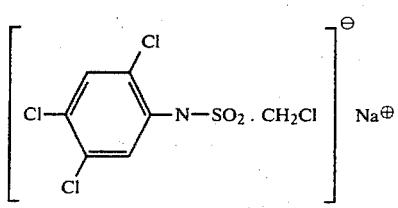

is melted together with 100 g of polyethylene wax (e.g. ®Hoechst-Wachs PAD 522) at 130°. The melt is further processed in the manner described in Example 1.

The resulting almost white, non-dusty, free-flowing granules containing 9.09% of active substance and 90.91% of polyethylene wax can be used as a moth-proofing agent for application, e.g. from perchloroethylene, to wool.

EXAMPLE 18

10 g of the substance of the formula

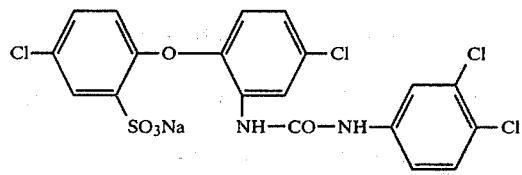

is melted together with 100 g of polyethylene wax (e.g. ®Hoechst-Wachs PAD 522) at 130°. The melt is further processed in the manner described in Example 1.

The resulting almost white, non-dusty, free-flowing granules containing 9.09% of active substance and 90.91% of polyethylene wax can be used as a moth-proofing agent for application, e.g. from perchloroethylene, to wool.

EXAMPLE 19

10 g of the substance of the formula

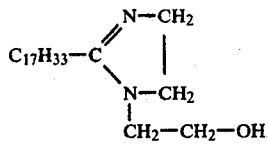

is melted together with 100 g of polyethylene wax (e.g. ®Hoechst-Wachs PAD 522) at 130°. The melt is further processed in the manner described in Example 1.

The resulting almost white, non-dusty, free-flowing granules containing 9.09% of active substance and 90.91% of polyethylene wax can be used as an antistatic agent for application, e.g. from perchloroethylene, to a variety of fibres.

I claim:

1. Non-dusty, free-flowing granules of optical brightener for solvent application, said granules containing an optical brightener, alone or together with a dispersing agent or auxiliary, dissolved in a melt of an organic carrier which is solid at room temperature, soluble in halogenated hydrocarbon and immiscible in water, selected from the group consisting of montan waxes, fatty acids and fatty acid amides, fatty alcohols of at least 12 carbon atoms and its ether derivatives thereof, paraffins, phthalic acid dicyclohexylester, phthalic acid monobenzyl ester, terephthalic acid dimethylester, polyacrylates, polymethacrylates and polyethylene waxes, said granules produced by (1) dissolving said optical brightener of finishing agent, alone or together with said dispersing agent or auxiliary, in said melt of organic carrier.

(2) emulsifying said melt in water which is at a temperature of at least 90° C. with the aid of an emulsifier.

(3) cooling the resulting emulsion with stirring, to produce a dispersion of said non-dusty, free flowing granules, in the aqueous emulsifying liquid, and (4) separating said non-dusty, free flowing granules from said aqueous emulsifying liquid.

2. Granules according to claim 1, wherein said organic carrier is selected from the group consisting of montan waxes, fatty acids, fatty alcohols of at least 12 carbon atoms and its ether derivatives thereof, paraffins, phthalic acid dicyclohexyl ester, phthalic acid monobenzyl ester, terephthalic acid dimethylester, polyacrylates, polymethacrylates and polyethylene waxes.

3. Granules according to claim 1, wherein said organic carrier is selected from the group consisting of stearic acid, polyethylene wax, polyvinyl ether of octadecyl alcohol, hard paraffin, stearic acid amide, terephthalic acid dimethyl ester, phthalic acid dicyclohexyl ester and phthalic acid monobenzyl ester.

4. Granules according to claim 1, wherein said organic carrier is an oxidized or non-oxidized polyethylene wax having a molecular weight of about 2000.

5. Granules according to claim 1, wherein said organic carrier is soluble in a lower aliphatic chlorinated hydrocarbon.

6. Granules according to claim 1, wherein said organic carrier is soluble in a chlorinated hydrocarbon boiling between 70° and 130° C.

7. Granules according to claim 1, wherein said organic carrier is soluble in tetrachloroethylene.

8. Granules according to claim 1, which contain 5 to 60 percent by weight of said textile processing agent, relative to the weight of the granule.

9. Granules according to claim 1, wherein said granules also contain a shading dye.

* * * * *